(12) United States Patent
Kallur Palli Kumar et al.

(10) Patent No.: US 11,741,693 B2
(45) Date of Patent: Aug. 29, 2023

(54) SYSTEM AND METHOD FOR SEMI-SUPERVISED CONDITIONAL GENERATIVE MODELING USING ADVERSARIAL NETWORKS

(71) Applicant: Palo Alto Research Center Incorporated, Palo Alto, CA (US)

(72) Inventors: Sricharan Kallur Palli Kumar, Mountain View, CA (US); Raja Bala, Pittsford, NY (US); Jin Sun, Redwood City, MD (US); Hui Ding, College Park, MD (US); Matthew A. Shreve, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1673 days.

(21) Appl. No.: 15/826,613

(22) Filed: Nov. 29, 2017

(65) Prior Publication Data
US 2019/0147333 A1  May 16, 2019

Related U.S. Application Data

(60) Provisional application No. 62/586,786, filed on Nov. 15, 2017.

(51) Int. Cl.
*G06V 10/82* (2022.01)
*G06N 3/08* (2023.01)
(Continued)

(52) U.S. Cl.
CPC .......... *G06V 10/82* (2022.01); *G06F 18/2413* (2023.01); *G06N 3/08* (2013.01); *G06V 10/451* (2022.01); *G06V 10/764* (2022.01)

(58) Field of Classification Search
None
See application file for complete search history.

(56) References Cited

PUBLICATIONS

Denton, Emily, Sam Gross, and Rob Fergus. "Semi-supervised learning with context-conditional generative adversarial networks." arXiv preprint arXiv:1611.06430 (2016). (Year: 2016).*

(Continued)

*Primary Examiner* — Omar F Fernandez Rivas
*Assistant Examiner* — Chaitanya R Jayakumar
(74) *Attorney, Agent, or Firm* — Shun Yao; YAO LEGAL SERVICES, INC.

(57) ABSTRACT

One embodiment facilitates generating synthetic data objects using a semi-supervised GAN. During operation, a generator module synthesizes a data object derived from a noise vector and an attribute label. The system passes, to an unsupervised discriminator module, the data object and a set of training objects which are obtained from a training data set. The unsupervised discriminator module calculates: a value indicating a probability that the data object is real; and a latent feature representation of the data object. The system passes the latent feature representation and the attribute label to a supervised discriminator module. The supervised discriminator module calculates a value indicating a probability that the attribute label given the data object is real. The system performs the aforementioned steps iteratively until the generator module produces data objects with a given attribute label which the unsupervised and supervised discriminator modules can no longer identify as fake.

16 Claims, 8 Drawing Sheets

(51) Int. Cl.
*G06F 18/2413* (2023.01)
*G06V 10/764* (2022.01)
*G06V 10/44* (2022.01)

(56) References Cited

PUBLICATIONS

Goodfellow, Ian, et al. "Generative adversarial nets." Advances in neural information processing systems. 2014. (Year: 2014).*
Mirza, Mehdi, and Simon Osindero. "Conditional generative adversarial nets." arXiv preprint arXiv:1411.1784 (2014). (Year: 2014).*
Springenberg, Jost Tobias. "Unsupervised and semi-supervised learning with categorical generative adversarial networks." arXiv preprint arXiv:1511.06390 (2015). (Year: 2015).*
Sricharan, Kumar, et al. "Semi-supervised conditional gans." arXiv preprint arXiv:1708.05789 (2017). (Year: 2017).*
Li, Chongxuan, et al. "Triple generative adversarial nets." arXiv preprint arXiv:1703.02291 (2017). (Year: 2017).*
Kumar Sricharan et al., "Semi-Supervised Conditional GANs", Aug. 18, 2017, Retrieved From the Internet: URL: https://arxiv.org/pdf/1708.05789.pdf, *the whole document*.

* cited by examiner

FIG. 6A (C-GAN)

FIG. 6B (AC-GAN)

FIG. 6C (SC-GAN)

FIG. 6D (SA-GAN)

FIG. 6E (SS-GAN)

SYSTEM AND METHOD FOR SEMI-SUPERVISED CONDITIONAL GENERATIVE MODELING USING ADVERSARIAL NETWORKS

RELATED APPLICATION

This application claims the benefit and priority of U.S. Provisional Application No. 62/586,786, entitled "SYSTEM AND METHOD FOR SEMI-SUPERVISED CONDITIONAL GENERATIVE MODELING USING ADVERSARIAL NETWORKS," by inventors Sricharan Kallur Palli Kumar, Raja Bala, Jin Sun, Hui Ding, and Matthew A. Shreve, filed 15 Nov. 2017, the disclosure of which is incorporated by reference herein.

BACKGROUND

Field

This disclosure is generally related to developing a conditional generative model. More specifically, this disclosure is related to a system and method for semi-supervised conditional generative modeling using adversarial networks.

Related Art

Generative adversarial networks (GANs) are a recent technique for learning generative models for high-dimensional unstructured data (e.g., images). GANs employ two networks: a generator G which produces samples from a data distribution; and a discriminator D which aims to distinguish real samples from the samples produced by G. The two networks alternatively try to best each other, ultimately resulting in the generator G converging to the true data distribution.

Many of the current GAN techniques are focused on the unsupervised setting, where the data is unlabeled (i.e., images with no attributes). Some current GAN techniques are also focused on the supervised setting, where all the data is labeled (e.g., images with attributes). For example, one approach in the supervised setting is a conditional GAN (C-GAN), which builds a conditional model that can generate images given a particular attribute. Another approach in the supervised setting is an auxiliary classifier GAN (AC-GAN), in which side information can be reconstructed by the discriminator.

However, it can be expensive to obtain a data set in which all the data is labeled, as in the supervised setting. One solution to address this cost is to employ the semi-supervised setting, where only a small fraction of the data is labeled. Some work has been performed using GANs in the semi-supervised setting. However, the current work does not efficiently address building conditional models in the semi-supervised setting.

SUMMARY

One embodiment facilitates generating synthetic data objects using a semi-supervised generative adversarial network. During operation, the system synthesizes, by a generator module, a data object $x_G$ derived from a noise vector z and an attribute label y. The system passes, to an unsupervised discriminator module, the data object $x_G$ and a set of training objects $x_T$ and $x_U$ which are obtained from a training data set. The system calculates, by the unsupervised discriminator module, a value indicating a probability that the data object $x_G$ is real. The system calculates, by the unsupervised discriminator module, a latent feature representation $h(x_G)$ of the data object $x_G$. The system passes the latent feature representation $h(x_G)$ to a supervised discriminator module. The system passes the attribute label y to the supervised discriminator module. The system calculates, by the supervised discriminator module, a value indicating a probability that the attribute label y given the data object $x_G$ is real. The system performs the aforementioned steps iteratively until the generator module produces data objects with a given attribute label which the unsupervised and supervised discriminator modules can no longer identify as fake.

In some embodiments, determining the probability that the data object $x_G$ is real further comprises determining that the data object $x_G$ is obtained from the training data set.

In some embodiments, the training data set includes a first number of data objects which do not have a corresponding attribute label and a second number of data objects which do have a corresponding attribute label, and the first number is greater by a predetermined ratio than the second number.

In some embodiments, the generator module, the unsupervised discriminator module, and the supervised discriminator module are deep neural networks.

In some embodiments, the generator module, the unsupervised discriminator module, and the supervised discriminator module comprise a model based on the semi-supervised generative adversarial network which: learns a first probability that data objects are real based on data objects which have a corresponding attribute label and data objects which do not have a corresponding attribute label; and learns a second probability that pairs comprised of a data object and a corresponding attribute label are real based on data objects which only have a corresponding attribute label. The model subsequently uses a partially labeled given data set to determine a dependency between a given data object and a given attribute label of the given data set, and subsequently generates a specific data object given a specific attribute label that satisfies the dependency between the given data object and the given attribute label.

In some embodiments, a data object and a corresponding attribute label are one or more of: an image and an attribute for the image; an audio file and an attribute for the audio file; and a first set of data and a tag for the first set of data.

In some embodiments, a data object is an image of a face, and a corresponding attribute label for the data object pertains to a presence or an absence of one or more of sunglasses, wrinkles, and facial cosmetics.

In some embodiments, a data object is an image of an alphanumeric character, and a corresponding attribute label for the data object pertains uniquely to the alphanumeric character.

BRIEF DESCRIPTION OF THE FIGURES

FIG. 6A illustrates digits generated by the C-GAN model in the fully supervised setting, where n=60,000 and m=0.

FIG. 6B illustrates digits generated by the AC-GAN model in the fully supervised setting, where n=60,000 and m=0.

FIG. 6C illustrates digits generated by the SC-GAN model in the small label supervised setting, where n=20 and m=0.

FIG. 6D illustrates digits generated by the SA-GAN model in the semi-supervised setting, where n=20 and m=60,000.

FIG. 6E illustrates digits generated by the SS-GAN model in the semi-supervised setting, where n=20 and m=60,000.

In the figures, like reference numerals refer to the same figure elements.

DETAILED DESCRIPTION

Figure 1A:
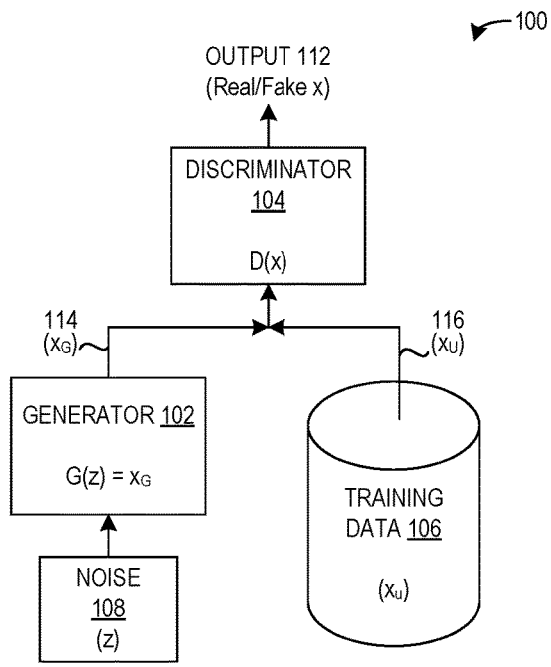
FIG. 1A illustrates an exemplary architecture of an unsupervised GAN, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the problem of utilizing the efficiencies gained for a semi-supervised setting in a GAN by providing a system which extends a conditional GAN into the semi-supervised setting by using a "stacked" discriminator. The system partitions the discriminator's task of evaluating if the joint samples of data and labels (e.g., images and attributes) are real or fake into two separate tasks: (i) evaluating if the images are real or fake; and (ii) evaluating if the attributes given an image are real or fake. The system uses all the labeled and unlabeled data to assist the discriminator with the first task, and uses only the labeled data for the second task. Note that task (i) (the "marginal distribution" of the images) is much harder to model relative to task (ii) (the "conditional distribution" of the attributes given an image).

Generative adversarial networks (GANs) are a recent technique for learning generative models for high-dimensional unstructured data (e.g., images). GANs employ two networks: a generator G which produces samples from a data distribution; and a discriminator D which aims to distinguish real samples from the samples produced by G. The two networks alternatively try to best each other, ultimately resulting in the generator G converging to the true data distribution.

Many of the current GAN techniques are focused on the unsupervised setting, where the data is unlabeled (i.e., images with no attributes). Some current GAN techniques are also focused on the supervised setting, where all the data is labeled (e.g., images with attributes). For example, one approach in the supervised setting is a conditional GAN (C-GAN), which builds a conditional model that can generate images given a particular attribute. Another approach in the supervised setting is an auxiliary classifier GAN (AC-GAN), in which side information can be reconstructed by the discriminator.

However, it can be expensive to obtain a data set in which all the data is labeled, as in the supervised setting. One solution to address this cost is to employ the semi-supervised setting, where only a small fraction of the data is labeled. Some work has been performed using GANs in the semi-supervised setting. However, the current work does not efficiently address building conditional models in the semi-supervised setting.

The embodiments described herein provide a system which efficiently addresses and improves the cost issue by developing a conditional GAN in a semi-supervised setting (SS-GAN). The system extends the C-GAN architecture to the semi-supervised setting and can utilize the unlabeled data, thus overcoming the cost of providing large quantities of labeled data to the discriminator. For example, the system improves the technology of machine learning by utilizing a data set which can include a large amount of unlabeled data (which is much less expensive to obtain than labeled data) along with a much smaller amount of labeled data (which, as described above, can be expensive). The system can thus learn a full conditional model of data objects given attribute labels from a large volume of unlabeled data objects, supplemented by very few labeled data objects. By learning the full conditional model using the embodiments described herein, the system can improve the technologies of machine learning (e.g., providing computers with the ability to learn without being explicitly programmed) and data analytics (e.g., data mining, including inspecting, cleansing, transforming, and modeling data in order to discover useful information).

Because SS-GAN builds on the existing GANs, an overview of unsupervised GANs, supervised GANs, and semi-supervised GANs is provided herein. Results from trials are also described herein, illustrating the performance of SS-GAN over the existing GAN approaches.

The term "data set" refers to a plurality of "data objects." The term "data object" can refer to an image, an audio file, a three-dimensional image, or any grouping of information or data.

The term "labeled data" can refer to a data object which has a corresponding label or attribute label. The term "unlabeled data" can refer to a data object which does not have a corresponding label or attribute label.

Framework for Existing GANs

Assume that the data set X is comprised of n+m images, where the first n images are accompanied by attributes Y. For example:

$$X = \{X_1, \ldots, X_n, X_{n+1}, \ldots, X_{n+m}\} \text{ and } Y = \{Y_1, \ldots, Y_n\}.$$

Each $X_i$ is assumed to be of dimension $p_x \times p_y \times p_c$, where $p_c$ is the number of channels. The attribute tags $Y_i$ are assumed to be discrete variables of dimension $\{0, 1, \ldots, K-1\}^d$, i.e., each attribute is assumed to be d-dimensional and each individual dimension of an attribute tag can belong to one of K different classes. This can accommodate class variables (d=1) and binary attributes (K=2). Furthermore, the joint distribution of images and attributes can be denoted by p(x, y), the marginal distribution of images by p(x), and the conditional distribution of attributes given images by p(y|x). The goal of the SS-GAN is to learn a generative model G(z, y) that can sample from p(x|y) for a given y by exploiting information from both the labeled and unlabeled sets.

Unsupervised GANs

In the unsupervised setting where the data is comprised solely of unlabeled data (i.e., n=0), the goal is to learn a generative model $G_u(z; \theta_u)$ that samples from the marginal image distribution p(x) by transforming vectors of noise z as $x = G_u(z; \theta_u)$. That is, the goal is to learn whether a given data (e.g., image) x is real or fake. In order for $G_u(\ )$ to learn this marginal distribution, a discriminator $D_u(x; \phi_u)$ is trained jointly. The unsupervised loss functions for the generator and discriminator, respectively, are as follows:

$$\mathcal{L}_d^u(D_u, G_u) = \frac{1}{n+m}\left(\sum_{i=1}^{n+m} \log(D_u(X_i; \phi_u)) + \log(1 - D_u(G_u(z_i; \theta_u); \phi_u))\right) \quad (1)$$

and $$\mathcal{L}_g^u(D_u, G_u) = \frac{1}{n+m}\left(\sum_{i=1}^{n+m} \log(D_u(G_u(z_i; \theta_u); \phi_u))\right) \quad (2)$$

Equations (1) and (2) are alternatively optimized with respect to $\phi_u$ and $\theta_u$ respectively. The unsupervised GAN model is described below in relation to FIG. 1A.

FIG. 1A illustrates an exemplary architecture 100 of an unsupervised GAN 100, in accordance with the prior art. Unsupervised GAN 100 can include a generator 102 (which corresponds to $G_u$ as previously described), a discriminator 104 (which corresponds to $D_u$ as previously described), and training data 106 (which includes unlabeled data $x_U$). During operation, generator 102 takes as input a noise 108 z, and produces data $x_G$ based on z, i.e., $G(z) = x_G$. Discriminator 104 takes as input both $x_G$ from generator 102 (communication 114) and $x_U$ from training data 106 (communication 116), and calculates D(x) to determine an output 112 (e.g., whether the x is real or fake). Generator 102 and discriminator 104 continue to iterate through the training process until generator 102 learns how to produce data (e.g., images) which look so real that discriminator 104 can no longer tell the difference (e.g., identify an image as fake).

Supervised GANs

In the supervised setting where all of the data is labeled (i.e., m=0), the goal is to learn a generative model $G_s(z, y; \theta_s)$ that samples from the conditional image distribution p(x|y), by transforming vectors of noise z as $x = G_s(z, y; \theta_s)$. That is, the goal is to learn whether a given (x, y) pair (e.g., (data, label) or (image, attribute)) is real or fake. In the case of handwritten digits, it is not sufficient for the generator to simply produce handwritten digits which look like realistic handwritten digits. The generator must also ensure that if the attribute y is "0," then the produced handwritten digit x is also a "0." Thus, both x and y together as a pair must be correct. In the supervised setting, because all data is labeled, a system can learn a model using GAN to ensure both that x is correct and that the (x, y) pair is correct. Two exemplary approaches to solving this problem are the conditional GAN (C-GAN) and the auxiliary-classifier GAN (AC-GAN).

—Conditional GAN (C-GAN)

In one exemplary conditional GAN model, in order for $G_d(\ )$ to learn the conditional distribution, a discriminator $D_s(x, y; \phi_s)$ is trained jointly. The goal of the discriminator is to distinguish whether the joint samples (x, y) are samples from the data or produced by the generator. The supervised loss functions for the generator and discriminator, respectively, for conditional GAN (C-GAN) are as follows:

$$\mathcal{L}_d^s(D_s, G_s) = \frac{1}{n}\left(\sum_{i=1}^{n} \log(D_s(X_i, Y_i; \phi_s)) + \log(1 - D_s(G_s(z_i, Y_i; \theta_s), Y_i; \phi_s))\right) \quad (3)$$

and $$\mathcal{L}_g^s(D_s, G_s) = \frac{1}{n}\left(\sum_{i=1}^{n} \log(D_s(G_s(z_i, Y_i; \theta_s); \phi_s))\right) \quad (4)$$

Equations (3) and (4) are alternatively optimized with respect to $\phi_s$ and $\theta_s$ respectively. The conditional GAN model is described below in relation to FIG. 1B.

Figure 1B:
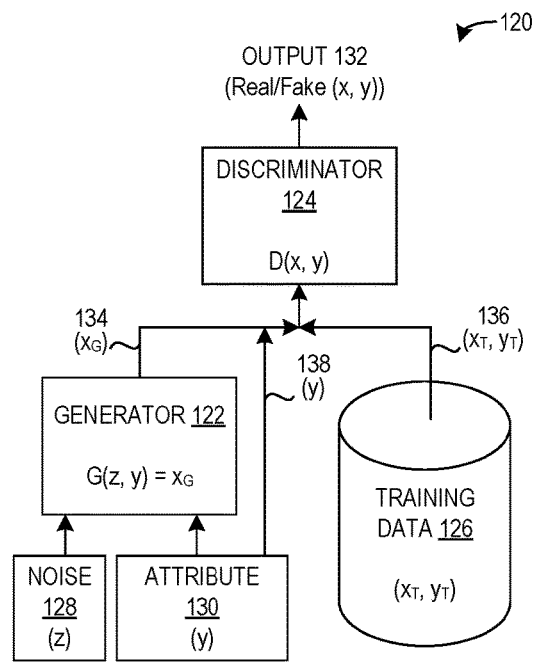
FIG. 1B illustrates an exemplary architecture of a conditional GAN (C-GAN) for the supervised setting, in accordance with the prior art.

FIG. 1B illustrates an exemplary architecture of a conditional GAN (C-GAN) 120 for the supervised setting, in accordance with the prior art. C-GAN 120 can include a generator 122 (which corresponds to G as previously described), a discriminator 124 (which corresponds to $D_s$ as previously described), and training data 126 (which includes labeled data ($x_T$, $y_T$)). During operation, generator 122 takes as input a noise 108 z and an attribute 130 y, and produces data $x_G$ based on z and y, i.e., $G(z, y) = x_G$. Discriminator 124 takes as input both $x_G$ from generator 122 (communication 134) and attribute 130 y (communication 138), as well as ($x_T$, $y_T$) from training data 126 (communication 136), and calculates D(x, y) to determine an output 132 (e.g., whether the (x, y) pair is real or fake).

—Auxiliary-Classifier GAN (AC-GAN)

In another exemplary conditional GAN model, the system only supplies the images x to the discriminator, and the discriminator additionally recovers the true attribute information y. In particular, the discriminator $D_a(x; \phi_a)$ produces two outputs: (i) $D_{a(rf)}(x; \phi_a)$, which is the probability of x being real or fake; and (ii) $D_{a(a)}(x, y; \phi_a)$, which is the estimated conditional probability of y given x. In addition to the unsupervised loss functions, the generator and discriminator are jointly trained to recover the true attributes for any given images in X. The attribute loss function can be defined as:

$$\mathcal{L}_a^a(D_{a(a)}, G_a) = \frac{1}{n}\left(\sum_{i=1}^{n} \log(D_{a(a)}(X_i; Y_i\phi_a) + \log(D_{a(a)}(G_a(z_i, Y_i; \theta_a); Y_i\phi_a)\right) \quad (5)$$

The loss functions for the generator and the discriminator, respectively, are as follows:

$$\mathcal{L}_g^a(D_a, G_a) = \mathcal{L}_g^u(D_{a(rf)}, G_a) + \mathcal{L}_a^a(D_{a(a)}, G_a) \quad (6)$$

and $$\mathcal{L}_d^a(D_a, G_a) = \mathcal{L}_d^u(D_{a(rf)}, G_a) + \mathcal{L}_a^a(D_{a(a)}, G_a) \quad (7)$$

Figure 1C:
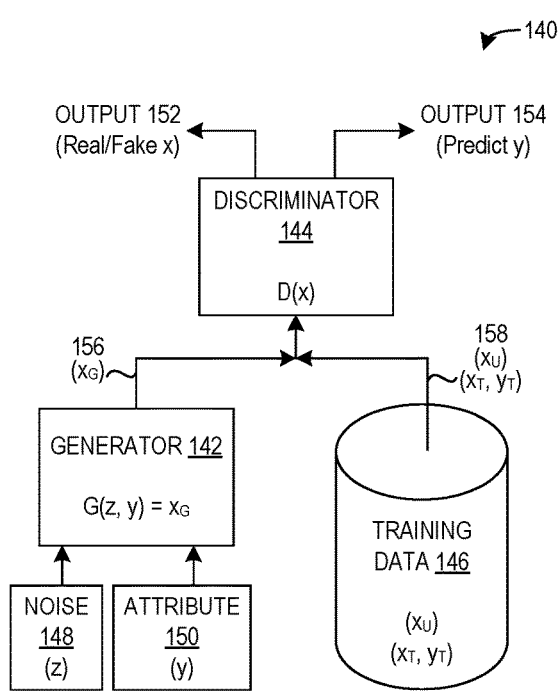
FIG. 1C illustrates an exemplary architecture of an auxiliary classifier GAN (AC-GAN) for the supervised and the unsupervised setting, in accordance with the prior art.

FIG. 1C illustrates an exemplary architecture of an auxiliary classifier GAN (AC-GAN) 140 for the supervised and the unsupervised setting, in accordance with the prior art. AC-GAN 140 can include a generator 142 (which corresponds to $G_a$ as previously described), a discriminator 144 (which corresponds to $D_a$ as previously described), and training data 146 (which includes both unlabeled data $x_U$ and labeled data $(x_T, y_T)$). During operation, generator 142 takes as input a noise 148 z and an attribute 150 y, and produces data $x_G$ based on z and y, i.e., $G(z, y)=x_G$. Discriminator 144 takes as input both $x_G$ from generator 142 (communication 156) and unlabeled data $x_U$ and labeled data $(x_T, y_T)$ from training data 146 (communication 158), and calculates D(x) to determine both an output 152 (e.g., whether the x is real or fake) and an output 154 (e.g., to predict y).

—Comparison Between C-GAN and AC-GAN

The key difference between C-GAN and AC-GAN is that in AC-GAN, the discriminator estimates the probability distribution of the attribute given the image, while in C-GAN, the discriminator $D_s$ is supplied with both (x, y) and then estimates the probability that (x, y) is consistent with the true joint distribution p(x, y). In comparing the performance of C-GAN and AC-GAN using qualitative and quantitative experiments on a collection of data sets, and through analysis (as described below), it can be seen that C-GAN typically outperforms AC-GAN in performance.

Semi-Supervised GANs

In the semi-supervised setting, some of the data is labeled (i.e., m>0), and typically there is much more unlabeled data than labeled data (i.e., n<<m). Both C-GAN and AC-GAN can be applied to the semi-supervised setting. Because C-GAN requires the attribute information to be fed to the discriminator, the semi-supervised setting for C-GAN can be applied by trivially training it only on the labeled data, and throwing away the unlabeled data. This model is referred to as "SC-GAN."

On the other hand, AC-GAN can be applied to this semi-supervised setting in a more useful manner. In particular, the adversarial loss terms $\mathcal{L}_d^u(D_a, G_a)$ and $\mathcal{L}_g^u(D_a, G_a)$ are evaluated over all the images in X, while the attribute estimation loss term $\mathcal{L}_a^a(D_a, G_a)$ is evaluated over only the n real images with attributes. This model is referred to as "SA-GAN." SA-GAN is illustrated above in relation to FIG. 1C.

Exemplary Embodiment of Semi-Supervised GAN (SS-GAN)

The embodiments described herein provide a system which includes a new model (SS-GAN) for learning conditional generator models in a semi-supervised setting. The system extends the C-GAN architecture to the semi-supervised setting and can utilize the unlabeled data, by overcoming the difficulty of having to provide side information to the discriminator. This addresses the cost associated with having to provide large quantities of labeled data to the discriminator.

Specifically, the system uses a stacked discriminator architecture which includes a pair of discriminators $D_u$ ("unsupervised discriminator") and $D_s$ ("supervised discriminator"), where $D_u$ is responsible for distinguishing real and fake images x, and $D_s$ is responsible for distinguishing real and fake (image, attribute) pairs (x, y). Unlike in C-GAN, $D_u$ can separately estimate the probability that x is real using both the labeled and unlabeled data, and $D_s$ can separately estimate the probability that y given x is real using only the labeled data. Note that the marginal distribution p(x) is much harder to model relative to the conditional distribution p(y|x), and by separately evaluating the marginal and conditional samples, the system can exploit the larger unlabeled pool to accurately estimate the marginal distribution.

—Description of SS-GAN Model

Let $D_{ss}(x, y; \phi_{ss})$ denote the discriminator, which is comprised of two stacked discriminators: (i) $D_s(x; \phi_{ss})$, which outputs the probability that the marginal image x is real or fake, and (ii) $D_u(x, y; \phi_{ss})$, which outputs the probability that the conditional attribute y given the image x is real or fake. The generator $G_{ss}(z, y; \theta_{ss})$ is identical to the generator in C-GAN and AC-GAN. The loss functions for the generator and the pair of discriminators are as follows:

$$\mathcal{L}_d^{ss}(D_u, G_{ss}) = \mathcal{L}_d^u(D_u, G_{ss}) \quad (8)$$

$$\mathcal{L}_d^{ss}(D_s, G_{ss}) = \mathcal{L}_d^s(D_s, G_{ss}) \quad (9)$$

and $$\mathcal{L}_g^{ss}(D_{ss}, G_{ss}) = \mathcal{L}_g^u(D_{ss(u)}, G_{ss}) + \alpha \mathcal{L}_g^s(D_{ss(s)}, G_{ss}) \quad (10)$$

The term α controls the effect of the conditional term relative to the unsupervised term.

$D_{ss(u)}(x; \phi_{ss})$ depends only on the x argument, and produces an intermediate output (last but one layer of unsupervised discriminator) h(x), to which the argument y is subsequently appended and fed to the supervised discriminator to produce the probability $D_{ss(s)}(x; \phi_{ss})$ that the joint samples (x, y) are real or fake. The semi-supervised GAN model is described below in relation to FIG. 1D.

One advantage of SS-GAN, which supplies x to $D_{ss(s)}$ via the features learned by $D_{ss(u)}$, over directly providing the x argument to $D_{ss(s)}$ is that $D_{ss(s)}$ cannot overfit to the few labeled examples, and instead must rely on the features general to the whole population in order to uncover the dependency between x and y.

As an example, consider the problem of conditional face generation where one of the attributes of interest is eye-glasses. Assume that in the limited set of labeled images, only one style of eye-glasses (e.g., glasses with thick rims) is encountered. In this case, the conditional discriminator can learn features specific to rims to detect glasses if the entire image x is available to the supervised discriminator. On the other hand, the features h(x) learned by the unsupervised discriminator would have to generalize over all kinds of eyeglasses and not just rimmed eyeglasses specifically. In the stacked model, by restricting the supervised discriminator to access the image x through the features h(x) learned by the unsupervised discriminator, the supervised discriminator can now generalize to all different types of eyeglasses when assessing the conditional fit of the glasses attribute.

Figure 1D:
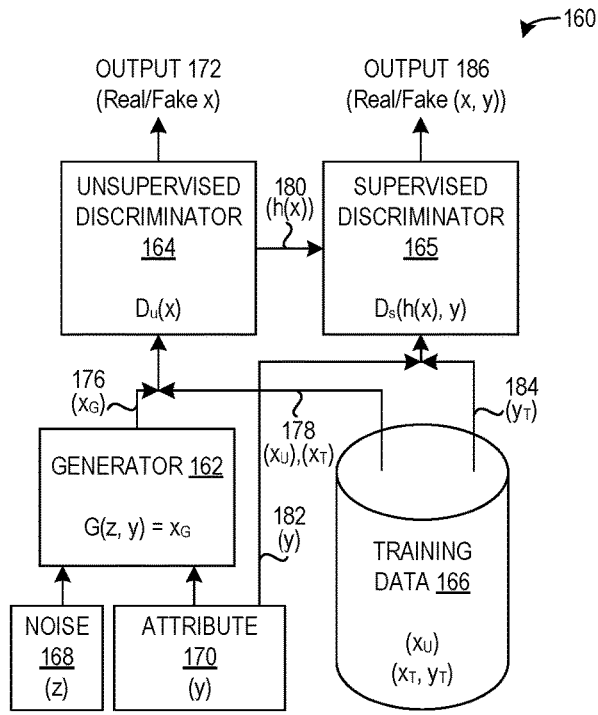
FIG. 1D illustrates an exemplary architecture of a semi-supervised stacked GAN (SS-GAN), in accordance with an embodiment of the present invention.

FIG. 1D illustrates an exemplary architecture of a semi-supervised stacked GAN (SS-GAN) 160, in accordance with an embodiment of the present invention. SS-GAN 160 can include a generator 162 (which corresponds to $G_{ss}$ as previously described), a pair of discriminators 164 and 165, and training data 166 (which includes both unlabeled data $x_U$ and labeled data $(x_T, y_T)$). Unsupervised discriminator 164 corresponds to $D_u$ as previously described, and supervised discriminator 165 corresponds to $D_s$ as previously described.

During operation, generator 162 takes as input a noise 168 z and an attribute 170 y, and produces data $x_G$ based on z and y, i.e., $G(z, y) = x_G$. Unsupervised discriminator 164 takes as input $x_G$ from generator 162 (communication 176) and the unlabeled data $x_U$ and the labeled $x_T$ (of labeled data $(x_T, y_T)$ from training data 166 (communication 178). Unsupervised discriminator 164 then calculates $D_u(x)$ to determine output 172 (e.g., whether the x is real or fake). That is, unsupervised discriminator 164 determines which of the data or images are produced by generator 162 (i.e., the $x_G$ fake images) and which of the data or images are from the training data (i.e., the $x_U$ and the $x_T$ real images).

As discriminator 164 learns which of the data or images is real or fake, generator 162 continues to produce data or images to confuse discriminator 164, such that generator 162 improves in producing data or images $x_G$ which look more and more realistic. At the same time, discriminator 164 continues to iterate through the training process, improving its own ability to distinguish between a real image and a fake image, until generator 162 learns to produce data or images $x_G$ which look so real that discriminator 164 can no longer tell the difference (e.g., identify an image as fake).

At this point, generator 162 has learned to produce the correct data $x_G$, but generator 162 has not yet learned the mapping between the data and the label (e.g., whether the (x, y) pair is correct). Unsupervised discriminator 164 produces an intermediate output h(x) (communication 180), which indicates a feature representation of the data. For example, if x is an image, h(x) can indicate a 100-dimensional vector which encodes useful or interesting features about the image, where the features may be used to determine an attribute of the image (e.g., the type of handwritten digit). A dimension can indicate, e.g., whether there is a vertical line, whether there is a 40-degree angle, etc.

Subsequently, supervised discriminator 165 takes as input pairs of values to determine an output 186. That is, supervised discriminator takes as input (h(x), y) pairs from generator 162 (e.g., $h(x_G)$ from communication 180, and y from communication 182), and also takes as input (h(x), y) pairs from training data 166 (e.g., $h(x_T)$ via communications 178 and 180, and $y_T$ from communication 184). Supervised discriminator 165 then calculates $D_s(h(x), y)$ to determine output 186 (e.g., whether the (x, y) pair is real or fake). That is, supervised discriminator 165 determines which of the (data, label) pairs are produced by generator 162 (i.e., the ($x_G$, y) fake pairs) and which of the (data, label) pairs are part of the training data (i.e., the $(x_T, y_T)$ real pairs). An exemplary communication in an SS-GAN model is described below in relation to FIGS. 2A-2D.

—Detailed Description of SS-GAN Model

Figure 2A:
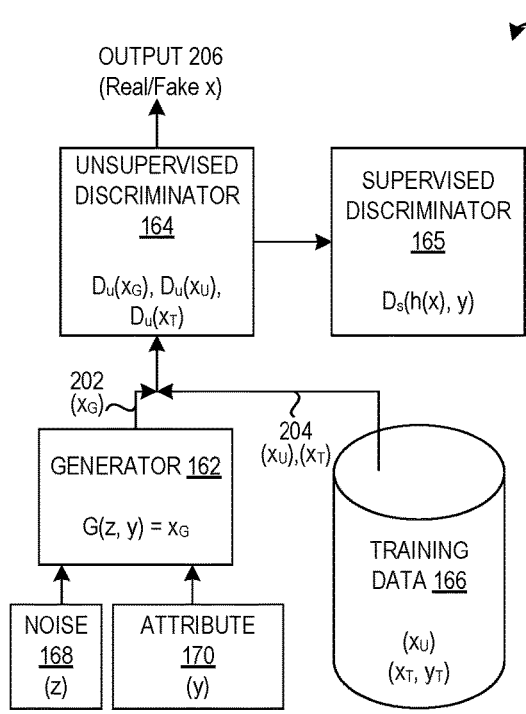
FIG. 2A illustrates an exemplary architecture of a semi-supervised stacked GAN (SS-GAN), including operations involving the unsupervised discriminator, in accordance with an embodiment of the present invention.

FIG. 2A illustrates an exemplary architecture of a semi-supervised stacked GAN (SS-GAN) 200, including operations involving the unsupervised discriminator, in accordance with an embodiment of the present invention. During operation, generator 162 takes as input a noise 168 z and an attribute 170 y, and produces data $x_G$ based on z and y, i.e., $G(z, y) = x_G$. Unsupervised discriminator 164 takes as input $x_G$ from generator 162 (communication 202) and the unlabeled data $x_U$ and the labeled $x_T$ (of labeled data $(x_T, y_T)$ from training data 166) (communication 204). Recall that the semi-supervised setting includes both labeled data and unlabeled data, and that there is typically much more unlabeled data than labeled data. In some embodiments, in a training data set or in a given data set to be classified after the SS-GAN model is trained, the number of unlabeled data objects is greater by a predetermined ratio or threshold than the number of labeled data objects.

Unsupervised discriminator 164 then calculates $D_u(x)$ to determine an output 206 (e.g., $D_u(x_G)$, $D_u(x_U)$, and $D_u(x_T)$ to determine whether the data or image x is real or fake). That is, unsupervised discriminator 164 determines which of the data or images are produced by generator 162 (i.e., the $x_G$ fake images) and which of the data or images are part of training data 166 (i.e., the $x_U$ and the $x_T$ real images).

Figure 2B:
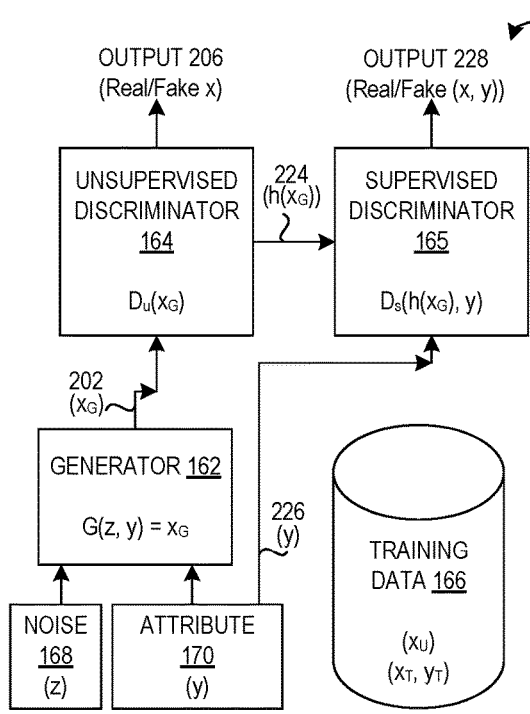
FIG. 2B illustrates an exemplary architecture of an SS-GAN, including operations involving the generator, the unsupervised discriminator, and the supervised discriminator, in accordance with an embodiment of the present invention.

FIG. 2B illustrates an exemplary architecture of an SS-GAN 220, including operations involving the generator, the unsupervised discriminator, and the supervised discriminator, in accordance with an embodiment of the present invention. Supervised discriminator 165 takes as input (h(x), y) pairs produced by generator 162. That is, supervised discriminator 165 takes $h(x_G)$ (communication 224) and y (communication 226), and calculates $D_s(h(x_G), y)$ to determine an output 228 (e.g., whether the (x, y) pair is real or fake).

Figure 2C:
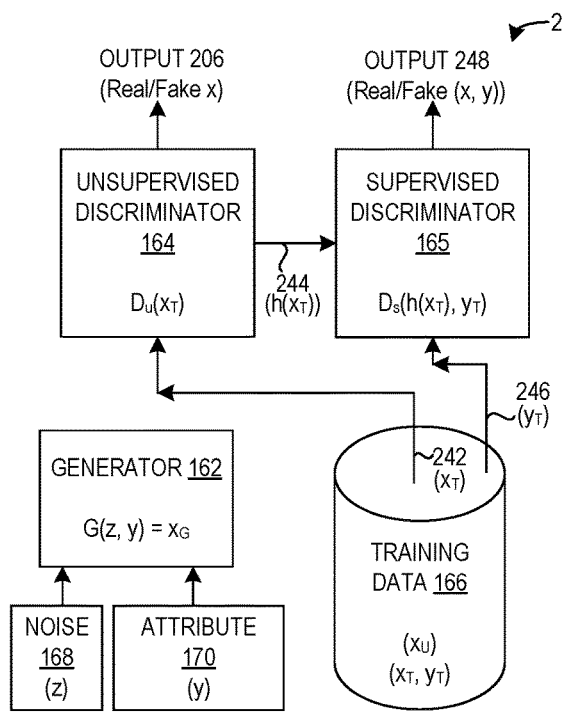
FIG. 2C illustrates an exemplary architecture of an SS-GAN, including operations involving the unsupervised discriminator and the supervised discriminator, in accordance with an embodiment of the present invention.

FIG. 2C illustrates an exemplary architecture of an SS-GAN 240, including operations involving the unsupervised discriminator and the supervised discriminator, in accordance with an embodiment of the present invention. Unsupervised discriminator 164 takes as input $x_T$ (via communication 242), calculates $D_u(x_T)$, and outputs the intermediate value $h(x_T)$ (communication 244). Supervised discriminator 165 then takes as input (h(x), y) pairs from training data 166. That is, supervised discriminator 165 takes as input $h(x_T)$ (communication 244) and $y_T$ (communication 246), and calculates $D_s(h(x_T), y_T)$ to determine an output 248 (e.g., whether the (x, y) pair is real or fake).

Thus, as described above in relation to FIG. 1D, supervised discriminator 165 determines which of the (data, label) pairs are produced by generator 162 (i.e., the ($x_G$, y) fake pairs) and which of the (data, label) pairs are part of the training data (i.e., the $(x_T, y_T)$ real pairs).

Figure 2D:
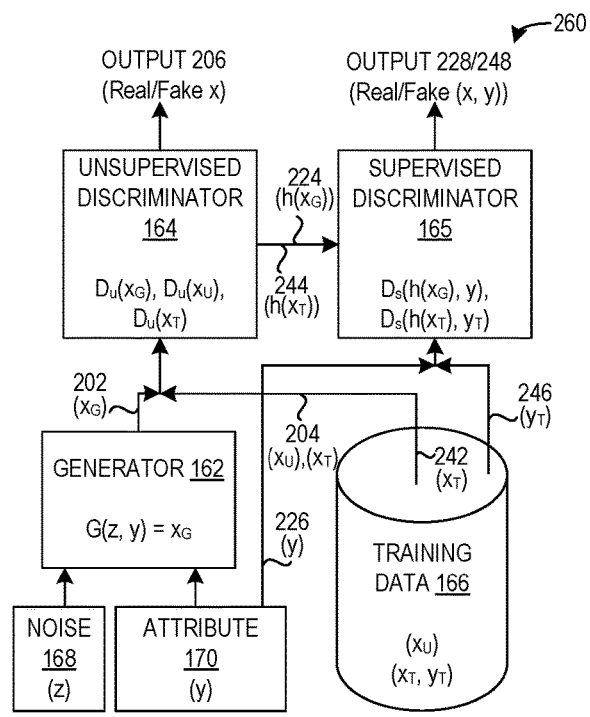
FIG. 2D illustrates an exemplary architecture of an SS-GAN, including the operations described above in relation to FIGS. 2B and 2C, in accordance with an embodiment of the present invention.

FIG. 2D illustrates an exemplary architecture of an SS-GAN 260, including the operations described above in relation to FIGS. 2B and 2C, in accordance with an embodiment of the present invention. Note that while FIG. 2D depicts both communication 204 (i.e., $x_U$ and $x_T$) and communication 242 (i.e., $x_T$), $x_T$ can be fed or transmitted from training data 166 to unsupervised discriminator 164 only as part of communication 204. That is, communication 242 is depicted for the sake of illustration. Architecture 260 of FIG. 2D is similar to architecture 160 of FIG. 1D.

—Convergence Analysis of SS-GAN Model

The distribution of the samples provided by the generator can be denoted as p'(x, y). Assuming that the discriminator has sufficient modeling power, as long as there is sufficient data x and the discriminator is trained to convergence, $D_u(x; \phi_{ss})$ will converge to $p(x)/(p(x)+p'(x))$, and consequently, the generator will adapt its output so that p'(x) will converge to p(x).

Because n is finite and typically small, it cannot be similarly guaranteed that $D_s(x, y; \phi_{ss})$ will converge to $p(x, y)/(p(x, y)+p'(x, y))$, and that consequently, the generator will adapt its output that so p'(x, y) will converge to p(x, y). However, note that because p'(x) will converge to p(x) through the use of $D_u$, $D_s(x, y; \phi_s)$ will equivalently look to converge to p(y|x)/(p(y|x)+p'(y|x)). Because these distributions are discrete, low-dimensional distributions, $D_s(x, y; \phi_{ss})$ will likely approach p(y|x)/(p(y|x)+p'(y|x)) even when n is small. Thus, the joint use of $D_u$ and $D_s$ can ensure that the joint distribution p'(x, y) will converge to the true distribution p(x, y).

Figure 3:
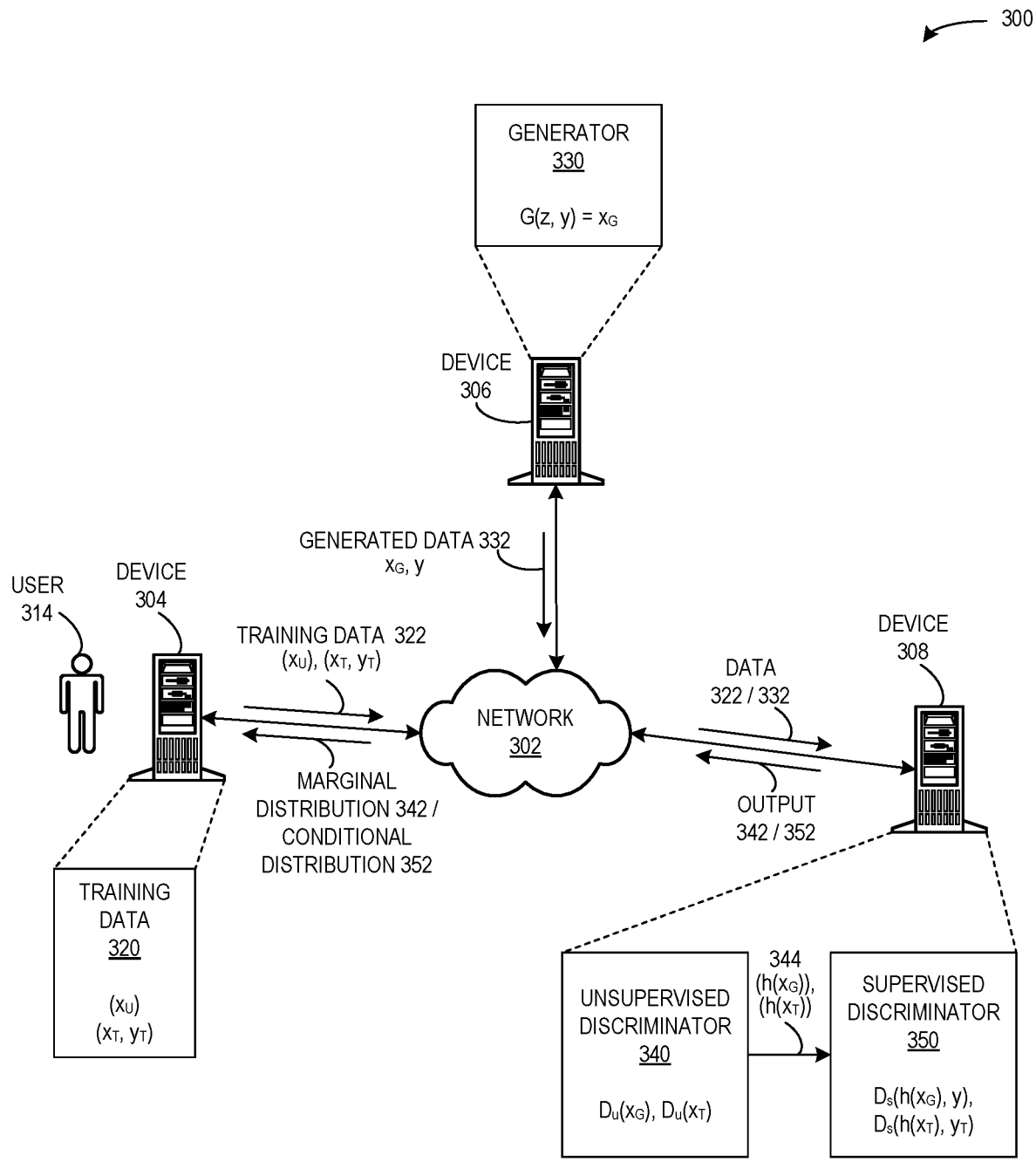
FIG. 3 illustrates an exemplary environment that facilitates generating synthetic data objects using a semi-supervised GAN, in accordance with an embodiment of the present invention.

Exemplary Environment for Facilitating Development of a Semi-Supervised Stacked Generative Adversarial Network FIG. 3 illustrates an exemplary environment 300 that facilitates generating synthetic data objects using a semi-supervised GAN, in accordance with an embodiment of the present invention. Environment 100 can include: a device 304 and an associated user 314; a device 306; and a device 308. Devices 304, 306, and 308 can communicate with each other via a network 302. In some embodiments, devices 304, 306, and 308 are part of separate networks, and can be defined as "networks" or network components which communicate or interact with each other as part of a generative adversarial network. Device 304 can include training data 320. Device 306 can include a generator 330 module or unit. Device 308 can include an unsupervised discriminator 340 module or unit as well as a supervised discriminator 350 module or unit. Note that training data 320, generator 330, and discriminators 340 and 350 are depicted in FIG. 3 as associated with, respectively, devices 304, 306, and 308, which communicate over network 302. However, the modules are only depicted in this manner for the sake of illustration, and are not tied to any specific hardware or network implementation.

During operation, user 314 (or device 304) can send training data 322 via network 302 to device 308. Generator 330 can generate data (e.g., G(z, y)=$x_G$), and device 306 can send generated data 332 via network 302 to device 308. Unsupervised discriminator 340 can take as input data objects such as $x_G$ from generated data 332 as well as data objects $x_U$ and $x_T$ from training data 322, and determine an output 342. Device 308 can send output 342 to user 314 (or device 304) as a marginal distribution 342 (e.g., a probability of whether a given data object x is real or fake).

Unsupervised discriminator 340 can also calculate or produce an intermediate output 344 based on a given input data object $x_G$, $x_U$, or $x_T$ (e.g., $h(x_G)$, $h(x_U)$, or $h(x_T)$). Supervised discriminator 350 can take as input (x, y) pairs of (data object, attribute), such as: (1) an intermediate output calculated based on the generated data 332 from generator 306, and an attribute y of the generated data 332 from generator 306 (e.g., ($h(x_G)$, y)); and (2) an intermediate output calculated based on training data 322 and a corresponding attribute $y_T$ (e.g., ($h(x_T)$, $y_T$)). Based on these inputs, supervised discriminator 350 can determine an output 352. Device 308 can send output 352 to user 314 (or device 304) as a conditional distribution 352 (e.g., a probability of whether a given (x, y) pair is real or fake, that is, a probability of whether a given y is real or fake given an x).

Method for Facilitating Building of a Conditional Generative Model

Figure 4:
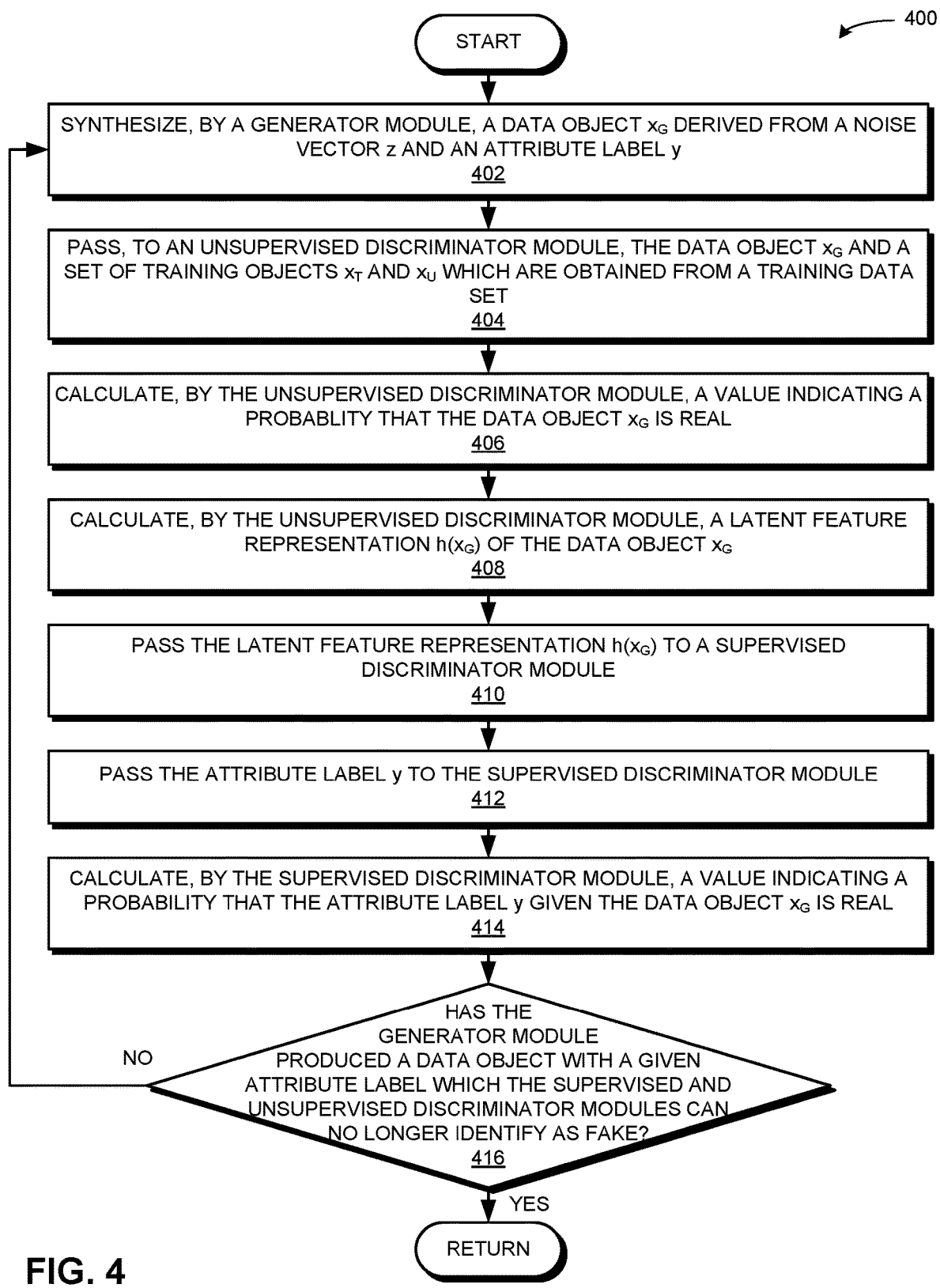
FIG. 4 presents a flow chart illustrating a method which facilitates generating synthetic data objects using a semi-supervised GAN, in accordance with an embodiment of the present invention.

FIG. 4 presents a flow chart 400 illustrating a method which facilitates generating synthetic data objects using a semi-supervised GAN, in accordance with an embodiment of the present invention. During operation, the system synthesizes, by a generator module, a data object $x_G$ derived from a noise vector z and an attribute label y (operation 402). The system passes, to an unsupervised discriminator module, the data object $x_G$ and a set of training objects $x_T$ and $x_U$ which are obtained from a training data set (operation 404). The system calculates, by the unsupervised discriminator module, a value indicating a probability that the data object $x_G$ is real (operation 406). The system calculates, by the unsupervised discriminator module, a latent feature representation $h(x_G)$ of the data object $x_G$ (operation 408). The system passes the latent feature representation $h(x_G)$ to a supervised discriminator module (operation 410). The system passes the attribute label y to the supervised discriminator module (operation 412). The system calculates, by the supervised discriminator module, a value indicating a probability that the attribute label y given the data object $x_G$ is real (operation 414). The system determines whether the generator module has produced a data object with a given attribute label which the supervised and unsupervised discriminator modules can no longer identify as fake (i.e., synthetic or as synthesized by the generator module) (decision 416). If it has, the operation returns. If it has not, the system iterates through the aforementioned steps (e.g., operations 402-414) until the generator module produces data objects with a given attribute label which the unsupervised and supervised discriminator modules can no longer identify as fake.

Trial Results

—Models and Data Sets

The results from a trial performed on the SS-GAN model are compared to four other models: 1) A standard GAN model applied to the full data set (i.e., C-GAN, as described above in relation to FIG. 1B); 2) A standard GAN model applied to only the labeled data set (i.e., SC-GAN, as described above in the section titled "Semi-Supervised GANs" and also in relation to FIG. 1B); 3) A supervised auxiliary classifier GAN model applied to the full data set (i.e., AC-GAN, as described above in relation to FIG. 1C); and 4) A semi-supervised AC-GAN model (i.e., SA-GAN, as described above in the section titled "Semi-Supervised GANs" and also in relation to FIG. 1C).

Exemplary data sets include the Modified National Institute of Standards and Technology (MNIST) data set, the CelebFaces Attribute data set (CelebA), and the Canadian Institute for Advanced Research (CIFAR)-10 data set. MNIST is a large database of 60,000 handwritten and labeled images of digits. CelebA is a large-scale face attributes data set with more than 200,000 celebrity images, each with 40 attribute annotations (e.g., bald, eyeglasses, smiling, brown hair, etc.). The CIFAR-10 data set consists of 60,000 32×32 color images in 10 classes, with 6,000 images per class. The 60,000 images include 50,000 training images and 10,000 test images, For purposes of illustration, the results herein pertain to trial results based on the MNIST data set. The trial uses the DCGAN architecture proposed in Radford, et al., "Unsupervised representation learning with deep convolutional generative adversarial networks," arXiv preprint arXiv: 1511.06434, 2015, with slight modifications to the generator and discriminator to accommodate the different variants described in Radford. These modifications primarily include: (i) concatenating the inputs (x, y) and (z, y) for the supervised discriminator and generator respectively; (ii) adding an additional output layer to the discriminator in the case of AC-GAN; and (iii) connecting the last but one layer of $D_u$ to $D_s$ in the SS-GAN.

—Evaluation Criteria

Several different evaluation criteria are used to contrast SS-GAN to the four models listed earlier (i.e., C-GAN, AC-GAN, SC-GAN, and SA-GAN), including:

1) Visual inspection of samples: The trial visually displays a large collection of samples from each of the models and highlights differences in samples from the different models.
2) Reconstruction error: The trial optimizes the inputs to the generator to reconstruct the original samples in the data set with respect to squared reconstruction error. Given the drawbacks of reconstruction loss, the trial also computes the structural similarity metric (SSIM) in addition to the reconstruction error, as in Wang, et al., "Image quality assessment: from error visibility to structural similarity," IEEE transactions on image processing, 13(4):600-612, 2004.
3) Attribute/class prediction from pre-trained classifier (for generator): The trial pre-trains an attribute/class predictor from the entire training data set, applies this predictor to the samples generated from the different models, and reports the accuracy (RMSE for attribute prediction, 0-1 loss for class prediction).
4) Supervised learning error (for discriminator): The trial uses the features from the discriminator, builds classifiers on these features to predict attributes, and reports the accuracy.
5) Sample diversity: To ensure that the samples being produced are representative of the entire population, and not just the labeled samples, the trial first trains a classifier that can distinguish between the labeled samples (class label 0) and the unlabeled samples (class label 1). The trial then applies this classifier to the samples generated by each of the generators, and computes the mean probability of the samples belonging to class 0. The closer this number is to 0, the better the unlabeled samples are represented.

—Visual Sample Inspection of MNIST

The trial performs semi-supervised training with a small randomly picked fraction of the 60,000 MNIST images, and considers setups with 10, 20, and 40 labeled examples. Each setup has a balanced number of examples from each class. The remaining training images are provided without labels.

Figure 5A:
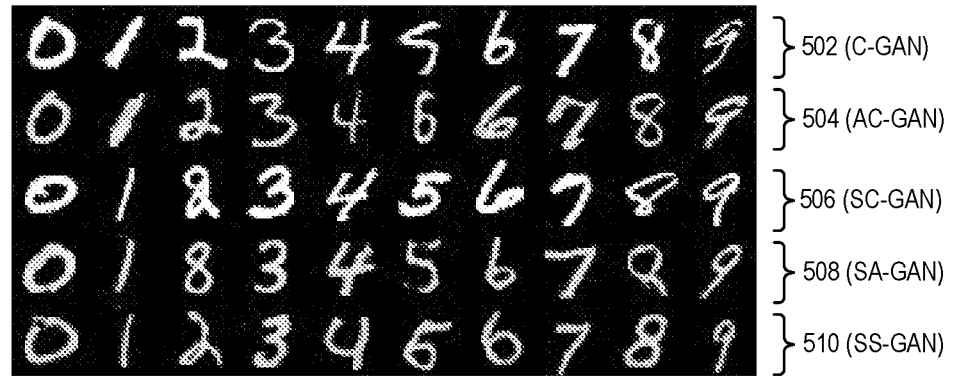
FIG. 5A illustrates a first set of representative samples from the five different models for the case with n=20 labeled examples.
Figure 5B:
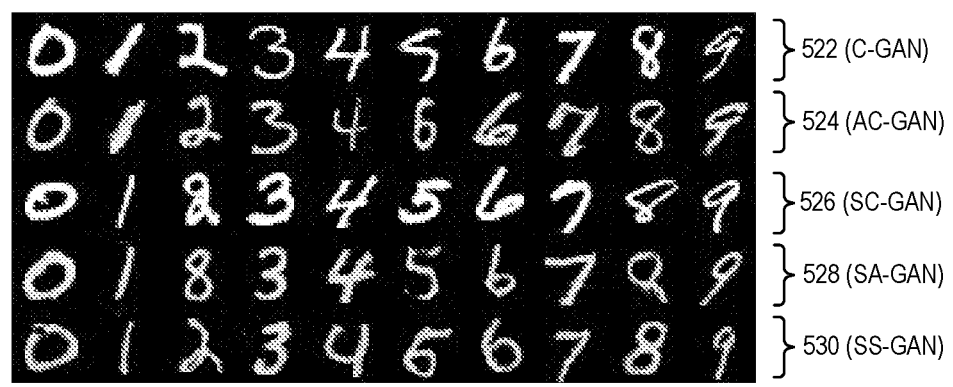
FIG. 5B illustrates a second set of representative samples from the five different models for the case with n=20 labeled examples.

FIGS. 5A and 5B illustrate representative samples from the five different models for the case with n=20 labeled examples. Each row corresponds to samples from each of the five models. FIG. 5A illustrates a first set of representative samples from the five different models for the case with n=20 labeled examples. Row 502 corresponds to C-GAN, row 504 corresponds to AC-GAN, row 506 corresponds to SC-GAN, row 508 corresponds to SA-GAN, and row 510 corresponds to SS-GAN. FIG. 5B illustrates a second set of representative samples from the five different models for the case with n=20 labeled examples. Similar to the rows in FIG. 5A, row 522 corresponds to C-GAN, row 524 corresponds to AC-GAN, row 526 corresponds to SC-GAN, row 528 corresponds to SA-GAN, and row 530 corresponds to SS-GAN. Note that in both FIGS. 5A and 5B, SS-GAN's performance is close to the supervised models (C-GAN and AC-GAN). SA-GAN gets certain digit associations wrong, while SC-GAN generates copies of digits from the labeled set.

Figures 6A, 6B, 6C:
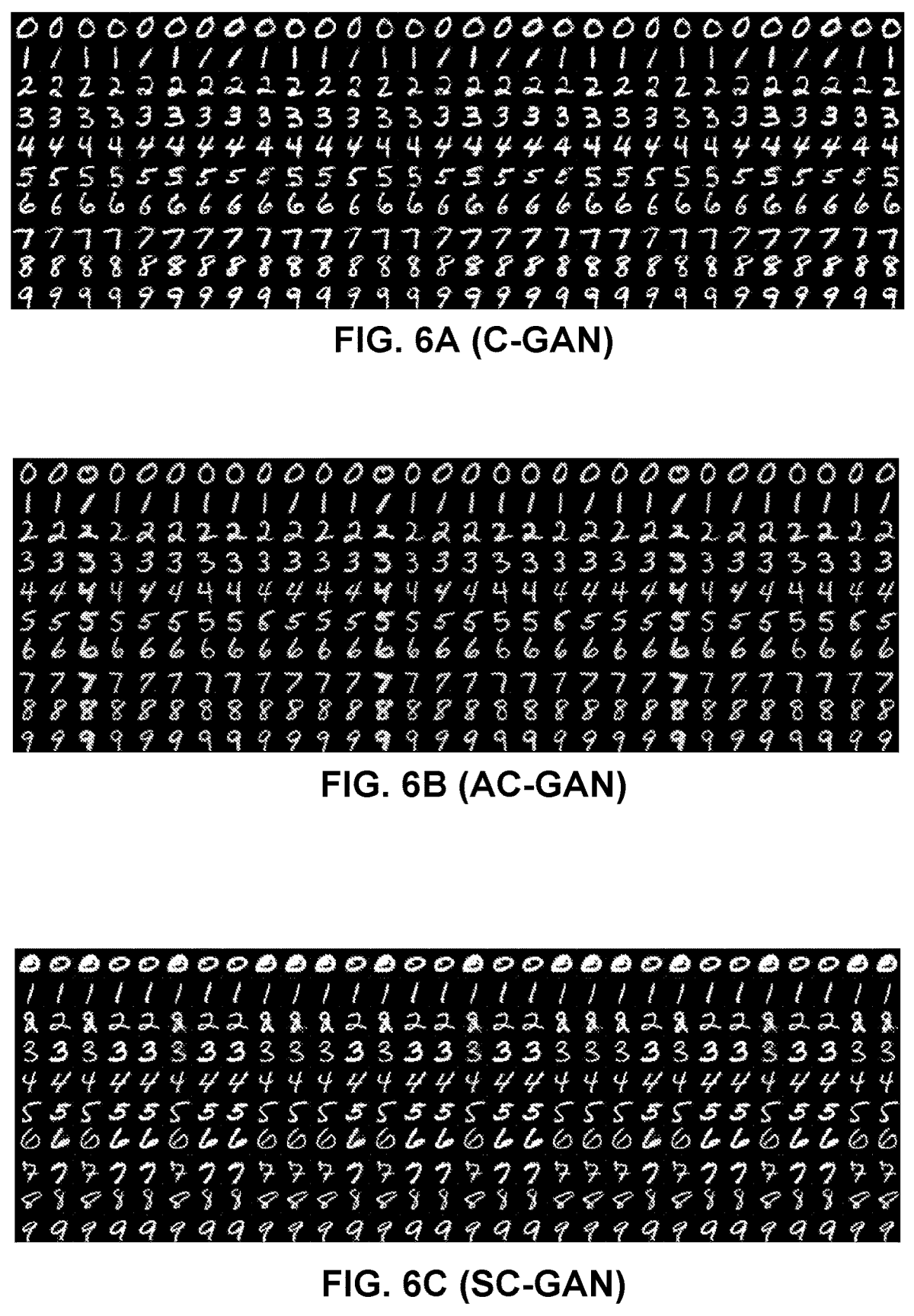

FIGS. 6A-6D illustrate more detailed results for this case with 20 labeled examples (two examples per digit). Each row corresponds to a particular digit. FIG. 6A illustrates digits generated by the C-GAN model in the fully supervised setting, where n=60,000 and m=0. FIG. 6B illustrates digits generated by the AC-GAN model in the fully supervised setting, where n=60,000 and m=0. Note that both C-GAN and AC-GAN successfully learn to model both the digits and the association between the digits and their class label.

Figures 6D, 6E:
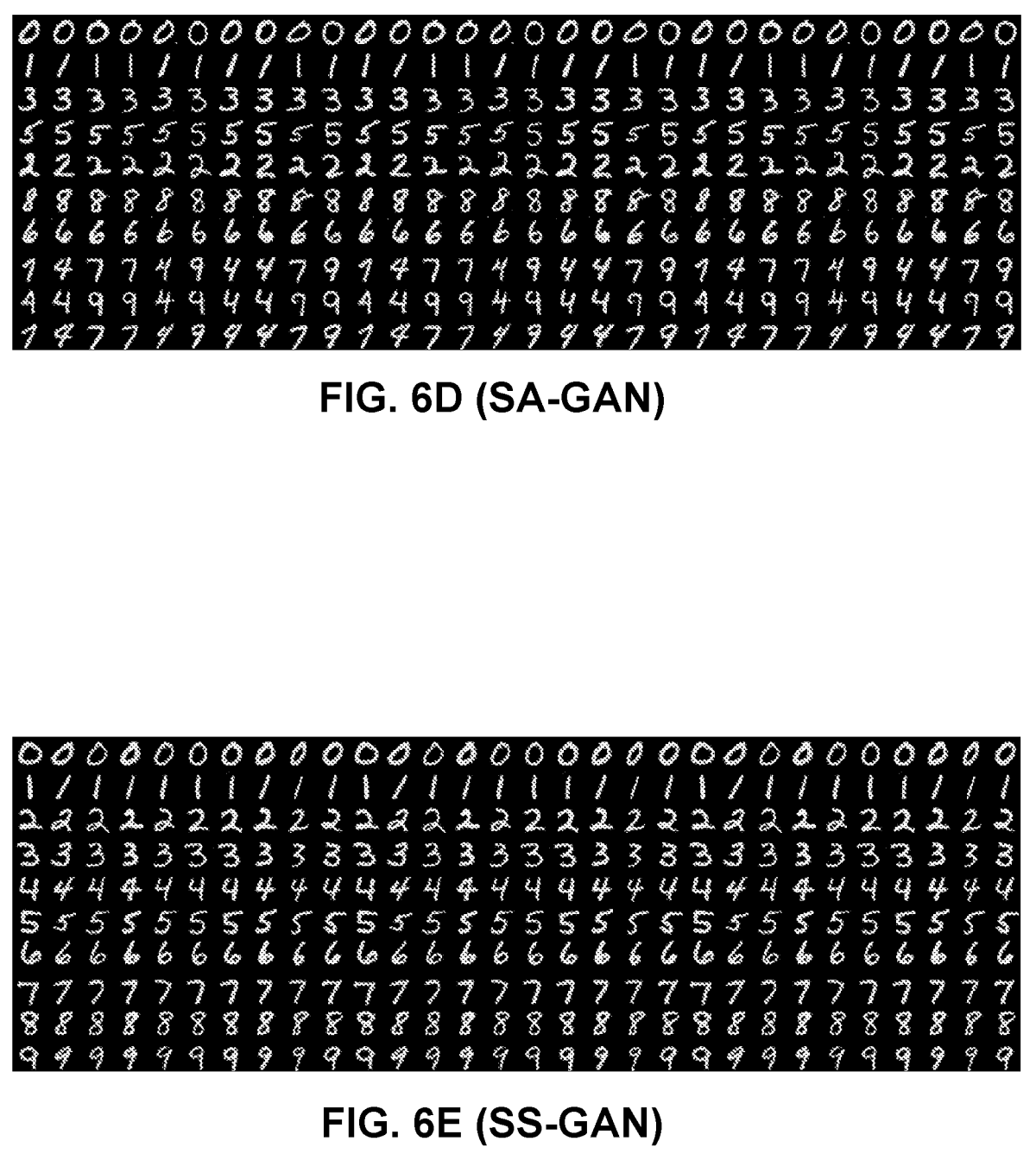

FIG. 6C illustrates digits generated by the SC-GAN model in the small label supervised setting, where n=20 and m=0. FIG. 6D illustrates digits generated by the SA-GAN model in the semi-supervised setting, where n=20 and m=60,000. FIG. 6E illustrates digits generated by the SS-GAN model in the semi-supervised setting, where n=20 and m=60,000. Based on FIG. 6C, it is clear that SC-GAN learns to predict only the digit styles of each digit made available in the labeled set. Based on FIG. 6D, while SA-GAN produces a greater diversity of samples, SA-GAN suffers in producing the correct digits for each label.

In contrast, based on FIG. 6E, SS-GAN both produces diverse digits while also being accurate. In particular, the performance of SS-GAN closely matches the performance of the fully supervised C-GAN and AC-GAN models. Tables 1-3 below show the quantitative results for, respectively, n=10, n=20, and n=40:

TABLE 1

(quantitative results for MNIST data set for n = 10)

| Samples source | Class pred. error | Recon. error | Sample diversity | Discrim. error |
| --- | --- | --- | --- | --- |
| True samples | 0.0327 | N/A | 0.992 | N/A |
| Fake samples | N/A | N/A | 1.14e−05 | N/A |
| C-GAN | 0.0153 | 0.0144 | 1.42e−06 | 0.1015 |
| AC-GAN | 0.0380 | 0.0149 | 1.49e−06 | 0.1140 |
| SC-GAN | 0.0001 | 0.1084 | 0.999 | 0.095 |
| SA-GAN | 0.3091 | 0.0308 | 8.62e−06 | 0.1062 |
| SS-GAN | 0.1084 | 0.0320 | 0.0833 | 0.1024 |

TABLE 2

(quantitative results for MNIST data set for n = 20)

| Samples source | Class pred. error | Recon. error | Sample diversity | Discrim. error |
| --- | --- | --- | --- | --- |
| True samples | 0.0390 | N/A | 0.994 | N/A |
| Fake samples | N/A | N/A | 2.86e−05 | N/A |
| C-GAN | 0.0148 | 0.01289 | 8.74e−06 | 0.1031 |
| AC-GAN | 0.0189 | 0.01398 | 9.10e−06 | 0.1031 |
| SC-GAN | 0.0131 | 0.0889 | 0.998 | 0.1080 |
| SA-GAN | 0.2398 | 0.02487 | 2.18e−05 | 0.1010 |
| SS-GAN | 0.1044 | 0.0160 | 2.14e−05 | 0.1014 |

TABLE 3

(quantitative results for MNIST data set for n = 40)

| Samples source | Class pred. error | Recon. error | Sample diversity | Discrim. error |
| --- | --- | --- | --- | --- |
| True samples | 0.0390 | N/A | 0.993 | N/A |
| Fake samples | N/A | N/A | 1.63e−05 | N/A |
| C-GAN | 0.0186 | 0.0131 | 1.36e−05 | 0.1023 |
| AC-GAN | 0.0141 | 0.0139 | 6.84e−06 | 0.1054 |
| SC-GAN | 0.0228 | 0.080 | 0.976 | 0.1100 |
| SA-GAN | 0.1141 | 0.00175 | 1.389e−05 | 0.1076 |
| SS-GAN | 0.0492 | 0.0135 | 3.54e−05 | 0.1054 |

—Discussion of Quantitative Results

Tables 1-3 above show the fraction of incorrectly classified points for each source, the reconstruction error, the sample diversity metric, and the discriminator error. Note that SS-GAN comfortably outperforms SA-GAN with respect to classification accuracy, and comfortably beats SC-GAN with respect to reconstruction error (due to the limited sample diversity of SC-GAN). The sample diversity metric for SS-GAN is slightly worse compared to SA-GAN, but significantly better than SC-GAN. Taken together, in conjunction with the visual analysis of the samples, these results demonstrate that SS-GAN performs better than SA-GAN and SC-GAN in the semi-supervised setting.

Furthermore, from the three sets of quantitative results in Tables 1-3 for the different labeled sample sizes (n=10, n=20, and n=40), note that the performance of all the models increases smoothly with increasing sample size, but SS-GAN continues to outperform the other two semi-supervised models (SC-GAN and SA-GAN) for each of the settings for the number of labeled samples.

—Semi-Supervised Learning Error

An additional trial is run for MNIST. The trial draws samples from the various generators, trains a classifier using each set of samples, and records the test error performance of this classifier. Given 20 labeled examples in MNIST, Table 4 shows the accuracy of classifiers trained using samples generated from different models using MNIST:

TABLE 4

(classifier accuracy using generated samples)

| Samples source | 10-fold 0-1 error |
|---|---|
| C-GAN | 5.1 |
| AC-GAN | 5.2 |
| SC-GAN | 12.9 |
| SA-GAN | 24.3 |
| SS-GAN | 5.4 |

The results in Table 4 demonstrate that SS-GAN is performs close to the supervised models. In particular, these results are the state-of-the-art for MNIST given just 20 labeled examples. However, the performance as the number of labeled examples increases remains fairly stationary, and furthermore is not very effective for more complex datasets such as CIFAR-10 and CelebA, indicating that this approach of using samples from GANs to train classifiers should be restricted to very low sample settings for simpler data sets like MNIST. Thus, SS-GAN performs better than SA-GAN and SC-GAN in the semi-supervised setting.

Exemplary Computer and Communication System

Figure 7:
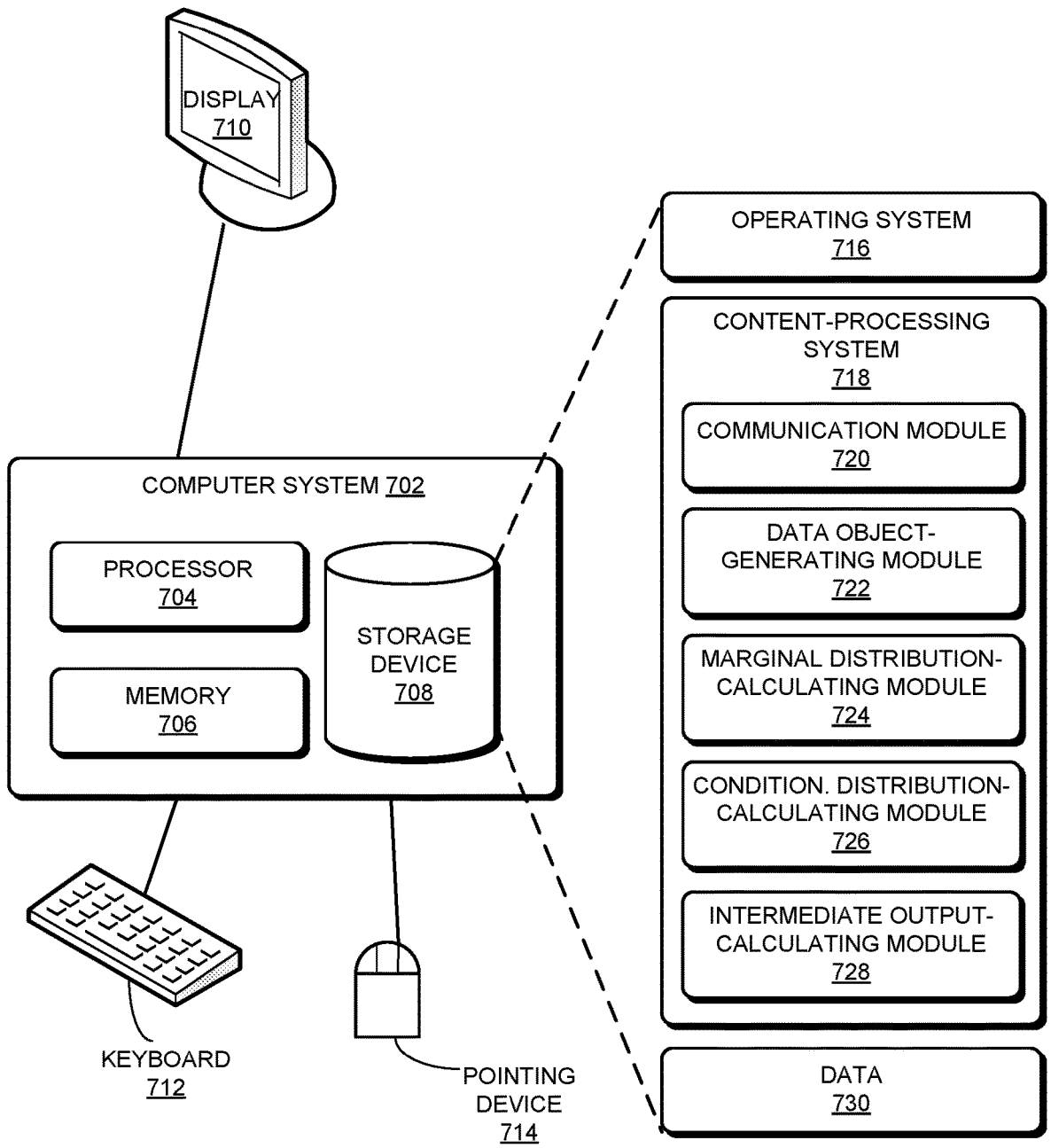
FIG. 7 illustrates an exemplary distributed computer and communication system that facilitates generating synthetic data objects using a semi-supervised GAN, in accordance with an embodiment of the present invention.

FIG. 7 illustrates an exemplary distributed computer and communication system that facilitates development of a semi-supervised stacked generative adversarial network, in accordance with an embodiment of the present invention. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a content-processing system 718, and data 730.

Content-processing system 718 can include instructions, which when executed by computer system 702, can cause computer system 702 to perform methods and/or processes described in this disclosure. Specifically, content-processing system 718 may include instructions for sending and/or receiving/obtaining data packets to/from other network nodes across a computer network (communication module 720). A data packet can include a data object and/or a label, such as an image and/or an attribute for the image. A data packet can also include a value which is an output or an intermediate output. A data packet can also include a probability, such as a marginal distribution or a conditional distribution.

Content-processing system 718 can include instructions for synthesizing, by a generator module, a data object $x_G$ derived from a noise vector z and an attribute label y (data object-generating module 722). Content-processing system 718 can include instructions for passing, to an unsupervised discriminator module, the data object $x_G$ and a set of training objects $x_T$ and $x_U$ which are obtained from a training data set (communication module 720). Content-processing system 718 can include instructions for calculating, by the unsupervised discriminator module, a value indicating a probability that the data object $x_G$ is real (marginal distribution-calculating module 724). Content-processing system 718 can include instructions for calculating, by the unsupervised discriminator module, a latent feature representation $h(x_G)$ of the data object $x_G$ (intermediate output-calculating module 728). Content-processing system 718 can include instructions for passing the latent feature representation $h(x_G)$ and the attribute label y to a supervised discriminator module (communication module 720). Content-processing system 718 can include instructions for calculating, by the supervised discriminator module, a value indicating a probability that the attribute label y given the data object $x_G$ is real (conditional distribution-calculating module 726). Content-processing system 718 can include instructions for performing the aforementioned steps iteratively until the generator module produces data objects with a given attribute label which the unsupervised and supervised discriminator modules can no longer identify as fake (data object-generating module 722).

Data 730 can include any data that is required as input or that is generated as output by the methods and/or processes described in this disclosure. Specifically, data 730 can store at least: data; a data set; a data distribution; a data object; an image; a label; an attribute; a pair which includes data and a corresponding label; a pair which includes an image and an attribute for the image; a value calculated based on a data object; a probability; an indicator that data, a data object, or a pair is real or fake; a marginal distribution; a conditional distribution; features for a data object; an intermediate output; an output; an output which is a probability; a number of data objects; a number of unlabeled or labeled data objects; a dependency between a data object and a label; and a predetermined ratio or threshold.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for generating synthetic data objects using a semi-supervised generative adversarial network, the method comprising:
   synthesizing, by a generator module, a data object $x_G$ derived from a noise vector z and an attribute label y, wherein the semi-supervised generative adversarial network comprises the generator module, an unsupervised discriminator module, and a supervised discriminator module;
   passing, to the unsupervised discriminator module, the data object $x_G$ and a set of training objects $x_T$ and $x_U$ which are obtained from a training data set,
   wherein the training data set includes the $x_U$ objects which do not have a corresponding attribute label and further includes the $x_T$ objects that do have corresponding attribute labels $y_T$;
   calculating, by the unsupervised discriminator module, a value indicating a probability that the data object $x_G$ is real;
   producing, by the unsupervised discriminator module, a first latent feature representation $h(x_G)$ of the data object $x_G$ and a second latent feature representation $h(x_T)$ of the data object $x_T$;
   passing the first and second latent feature representations $h(x_G)$ and $h(x_T)$ to the supervised discriminator module;
   passing the attribute label y and an attribute label $y_T$ corresponding to the data object $x_T$ to the supervised discriminator module;
   receiving, by the supervised discriminator module as input, a first pair comprising the first latent feature representation $h(x_G)$ produced by the unsupervised discriminator module and the attribute label y and a second pair comprising the second latent feature representation $h(x_T)$ produced by the unsupervised discriminator module and the corresponding $y_T$ attribute;
   calculating, by the supervised discriminator module based on at least the first pair and the second pair, a value indicating a probability that the attribute label y given the data object $x_G$ is real; and
   performing the aforementioned steps iteratively until the generator module produces data objects with a given attribute label which the unsupervised and supervised discriminator modules can no longer identify as fake.

2. The method of claim 1, wherein calculating the value indicating the probability that the data object $x_G$ is real further comprises determining that the data object $x_G$ is obtained from the training data set.

3. The method of claim 1, wherein the training data set includes a first number of data objects which do not have a corresponding attribute label and a second number of data objects which do have a corresponding attribute label, and wherein the first number is greater by a predetermined ratio than the second number.

4. The method of claim 1, wherein the generator module, the unsupervised discriminator module, and the supervised discriminator module are deep neural networks.

5. The method of claim 1, wherein the generator module, the unsupervised discriminator module, and the supervised discriminator module comprise a model based on the semi-supervised generative adversarial network which:
   learns a first probability that data objects are real based on data objects which have a corresponding attribute label and data objects which do not have a corresponding attribute label; and
   learns a second probability that pairs comprised of a data object and a corresponding attribute label are real based on data objects which only have a corresponding attribute label; and
   wherein the model subsequently uses a partially labeled given data set to determine a dependency between a given data object and a given attribute label of the given data set; and
   subsequently generates a specific data object given a specific attribute label that satisfies the dependency between the given data object and the given attribute label.

6. The method of claim 1, wherein a data object and a corresponding attribute label are one or more of:
   an image and an attribute for the image;
   an audio file and an attribute for the audio file; and
   a first set of data and a tag for the first set of data.

7. The method of claim 1, wherein a data object is an image of a face, and a corresponding attribute label for the data object pertains to a presence or an absence of one or more of sunglasses, wrinkles, and facial cosmetics.

8. The method of claim 1, wherein a data object is an image of an alphanumeric character, and a corresponding attribute label for the data object pertains uniquely to the alphanumeric character.

9. A computer system for generating synthetic data objects using a semi-supervised generative adversarial network, the system comprising:
   a processor; and
   a storage device storing instructions that when executed by the processor cause the processor to perform a method, the method comprising:
      synthesizing, by a generator module, a data object $x_G$ derived from a noise vector z and an attribute label y,
      wherein the semi-supervised generative adversarial network comprises the generator module, an unsupervised discriminator module, and a supervised discriminator module;
      passing, to the unsupervised discriminator module, the data object $x_G$ and a set of training objects $x_T$ and $x_U$ which are obtained from a training data set,
      wherein the training data set includes the $x_U$ objects which do not have a corresponding attribute label and further includes the $x_T$ objects that do have corresponding attribute labels $y_T$;
      calculating, by the unsupervised discriminator module, a value indicating a probability that the data object $x_G$ is real;
      producing, by the unsupervised discriminator module, a first latent feature representation $h(x_G)$ of the data object $x_G$ and a second latent feature representation $h(x_T)$ of the data object $x_T$;

passing the first and second latent feature representations $h(x_G)$ and $h(x_T)$ to the supervised discriminator module;

passing the attribute label y and an attribute label $y_T$ corresponding to the data object $x_T$ to the supervised discriminator module;

receiving, by the supervised discriminator module as input, a first pair comprising the first latent feature representation $h(x_G)$ produced by the unsupervised discriminator module and the attribute label y and a second pair comprising the second latent feature representation $h(x_T)$ produced by the unsupervised discriminator module and the corresponding $y_T$ attribute;

calculating, by the supervised discriminator module based on at least the first pair and the second pair, a value indicating a probability that the attribute label y given the data object $x_G$ is real; and performing the aforementioned steps iteratively until the generator module produces data objects with a given attribute label which the unsupervised and the supervised discriminator modules can no longer identify as fake.

10. The computer system of claim 9, wherein calculating the value indicating the probability that the data object $x_G$ is real further comprises determining that the data object $x_G$ is obtained from the training data set.

11. The computer system of claim 9, wherein the training data set includes a first number of data objects which do not have a corresponding attribute label and a second number of data objects which do have a corresponding attribute label, and wherein the first number is greater by a predetermined ratio than the second number.

12. The computer system of claim 9, wherein the generator module, the unsupervised discriminator module, and the supervised discriminator module are deep neural networks.

13. The computer system of claim 9, wherein the generator module, the unsupervised discriminator module, and the supervised discriminator module comprise a model based on the semi-supervised generative adversarial network which:

learns a first probability that data objects are real based on data objects which have a corresponding attribute label and data objects which do not have a corresponding attribute label; and learns a second probability that pairs comprised of a data object and a corresponding attribute label are real based on data objects which only have a corresponding attribute label; and wherein the model subsequently uses a partially labeled given data set to determine a dependency between a given data object and a given attribute label of the given data set; and subsequently generates a specific data object given a specific attribute label that satisfies the dependency between the given data object and the given attribute label.

14. The computer system of claim 9, wherein a data object and a corresponding attribute label are one or more of:

an image and an attribute for the image;

an audio file and an attribute for the audio file; and a first set of data and a tag for the first set of data.

15. The computer system of claim 9, wherein a data object is an image of a face, and a corresponding attribute label for the data object pertains to a presence or an absence of one or more of sunglasses, wrinkles, and facial cosmetics.

16. The computer system of claim 9, wherein a data object is an image of an alphanumeric character, and a corresponding attribute label for the data object pertains uniquely to the alphanumeric character.

* * * * *

UNITED STATES PATENT AND TRADEMARK OFFICE
CERTIFICATE OF CORRECTION

PATENT NO. : 11,741,693 B2  
APPLICATION NO. : 15/826613  
DATED : August 29, 2023  
INVENTOR(S) : Sricharan Kallur Palli Kumar et al.

Page 1 of 1

It is certified that error appears in the above-identified patent and that said Letters Patent is hereby corrected as shown below:

On the Title Page

Item (73) Assignee: "Palo Alto Research Center Incorporated, Palt Alto, CA (US)" Should Read "Xerox Corporation, Norwalk, CT (US)"

Signed and Sealed this  
Tenth Day of October, 2023

Katherine Kelly Vidal  
*Director of the United States Patent and Trademark Office*